United States Patent [19]

Ng

[11] Patent Number: 5,782,318
[45] Date of Patent: Jul. 21, 1998

[54] BEARING LUBRICATION APPARATUS

[76] Inventor: Gim Shek Ng, 213 Oak La.. Yorktown, Va. 23693

[21] Appl. No.: 872,489

[22] Filed: Jun. 7, 1997

[51] Int. Cl.$^6$ .................................................. F16C 1/24
[52] U.S. Cl. ........................ 184/5.1; 184/38.1; 184/105.1
[58] Field of Search ........................ 184/5, 5.1, 105.1, 184/37, 38.1, 105.2

[56] References Cited

U.S. PATENT DOCUMENTS

| | | |
|---|---|---|
| 1,766,208 | 6/1930 | Anstiss . |
| 2,137,659 | 11/1938 | Welke . |
| 2,178,816 | 11/1939 | Sibley ........................ 184/5.1 |
| 2,210,478 | 8/1940 | Berg . |
| 2,248,940 | 7/1941 | Berg . |
| 2,270,754 | 1/1942 | Ginter . |
| 2,615,532 | 10/1952 | Drury ........................ 184/5.1 |
| 2,652,843 | 9/1953 | Schuchman . |
| 2,729,305 | 1/1956 | Hammel . |
| 2,968,362 | 1/1961 | Elliott . |
| 4,113,059 | 9/1978 | Markovski . |
| 4,168,766 | 9/1979 | Shultz ........................ 184/5.1 |
| 4,405,035 | 9/1983 | Shultz ........................ 184/5.1 |
| 5,036,950 | 8/1991 | Clark . |
| 5,080,198 | 1/1992 | Rice ........................ 184/105.1 |

*Primary Examiner*—Thomas E. Denion
*Attorney, Agent, or Firm*—Wallace J. Nelson

[57] ABSTRACT

A bearing lubrication apparatus, including a bearing support stand having a reverse conical stepped cavity therein to support a wheel or other friction bearing assembly, a grease applicator in the form of an open cylinder filled with lubricating grease, and a manually operated piston disposed within the open cylinder to force grease from the cylinder through a bearing raceway supported on one of the horizontal steps of the bearing support stand. As new grease is forced through the bearing raceway, old grease on each individual ball or roller bearing is removed and replaced by new grease. A process for filling the grease applicator involves placing the open cylinder in an inverted position and forcing one open end thereof into a container of highly viscous lubrication grease, placing a finger over the other open end of the cylinder to trap any air therein and create a suction force within the cylinder that retains the contained grease as the cylinder is removed from the grease container.

9 Claims, 2 Drawing Sheets

BEARING LUBRICATION APPARATUS

FIELD OF THE INVENTION

This invention relates generally to lubrication apparatus and relates specifically to a lubrication apparatus for packing friction bearings, such as roller bearings and ball wheel bearings, with a lubricant grease.

BACKGROUND OF THE INVENTION

Friction bearings generally consist of a hollow body in the form of a ring having equally spaced rotatable rollers or balls held therein by a suitable ring or cage. These bearings may be single, or double row, ball radial bearings, cylindrical roller bearings, tapered roller bearings, and the like. These bearings perform to reduce the friction and thus extend the life and wear-ability of relatively rotating parts, such as wheels and axles. It is accepted practice to embed these rollers, or balls, with high viscosity lubrication greases known as "axle" and "cup" greases. These greases are employed to pack the bearing structures, by hand, or by use of one of numerous applicator devices available to improve the packing process. Many of the prior art applicators are expensive to purchase, slow in operation, complicated to use, and do not provide a clean process.

Thus, improved, economical, faster and simplified applicators for performing the bearing packing process are needed and would be welcome to the mechanic trade, in general, and particularly welcome to the home mechanic.

SUMMARY OF THE INVENTION

Accordingly, it is an object of the present invention to provide an improved and faster grease applicator for removing old grease from friction bearing assemblies while simultaneously packing the bearings with new grease.

Another object of the present invention is to provide an inexpensive grease applicator for friction bearings that is simple to use and requires a minimum of direct hand contact of the grease by the operator.

Another object of the present invention is a novel process for filling a grease applicator with minimum grease hand contact.

According to the present invention the foregoing and additional objects are attained by providing a bearing support stand disposed on a horizontal surface and having a tapered, or reverse conical, depressed interior surface cavity area formed of increasing diameter circumferential steps along the surface thereof to support various diameter friction bearing assemblies. An elongated open cylinder containing grease for a friction bearing, and having an integral frusto-conical flange formed at a first open end thereof, is disposed in contacting relationship with a bearing assembly placed on one of the circumferential steps of the bearing support stand. The pitch of the frusto-conical flange is substantially equal to the pitch of the stepped reverse conical cavity in the bearing support stand. A manually operated plunger is slidably disposed within a second open end of the open cylinder and employed to force grease from the open cylinder through the bearing assembly. As the new grease from the open cylinder is forced into the bearing assembly, the old grease is removed from the bearing assembly and replaced with the new grease.

The open cylinder is filled, as needed, with new grease by forcing the second open end of the empty cylinder in an inverted position into a container of grease, and closing the first open end thereof with a finger, while extracting the cylinder from the grease container to thereby trap the grease contained therein within the open cylinder.

BRIEF DESCRIPTION OF THE DRAWINGS

A more complete appreciation of the invention and many of the attendant advantages thereof will be more readily apparent as the same becomes better understood with reference to the following drawings wherein.

DETAILED DESCRIPTION

Figure 1:
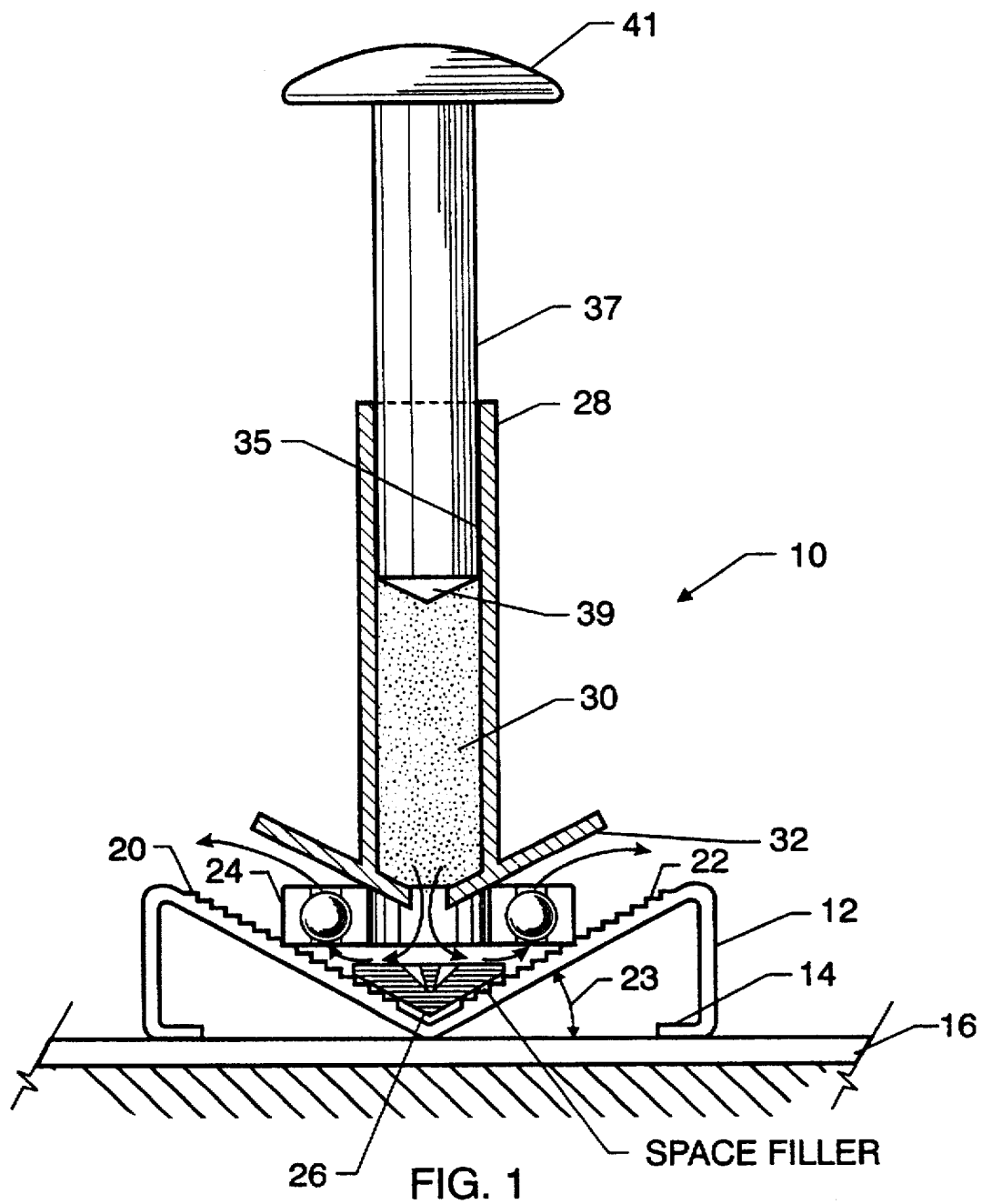
FIG. 1 is a part schematic section view of the lubrication apparatus of the present invention.

Referring now to the drawings, and more particularly to FIG. 1, the bearing lubrication apparatus of the present invention is schematically shown and designated generally by reference numeral 10. In the illustrated embodiment, apparatus 10 includes a one-piece annular bearing support stand 12 having an in-turned base ring segment 14 that rests on a horizontal support surface 16. Support surface 16 is, conventionally, a work bench or suitable table. Bearing support stand 12 is provided with a central depressed cavity 20, in the form of an inverted cone, and having a plurality of circumferentially disposed steps 22 along, and forming, the surface thereof. Double pointed arrow 23 indicates the pitch angle for cavity 20. This pitch angle is in the range of 10-30 degrees in the preferred embodiment of the present invention.

Steps 22 serve to provide horizontal support for various diameter friction bearing assemblies, such as the ball radial bearing 24 shown in FIG. 1. A suitable conical space filler 26 is employed to fill the major portion of unused space in the cavity 20 below bearing assembly 24 and also serves to minimize the quantity of grease needed to pack bearing assembly 24.

An elongated open cylinder 28 is disposed perpendicular to bearing assembly 24 and contains a quantity of bearing packing grease 30 therein. Open cylinder 28 is provided with a first open end 33 formed at the apex of a frusto-conical flange 32 integral with open cylinder 28. The angular pitch of frusto-conical flange 32 is essentially equal to the pitch of cavity 20 in bearing stand 12, or essentially in the range of 10-30 degrees.

A second open end 35 of cylinder 28 is spaced from first open end 33 thereof, with the area therebetween defining a cavity for containing a quantity of lubricating grease 30. An elongated slidable plunger, or piston, 37 is disposed within second open end 35 of cylinder 28 and contacts grease 30 therein. Slidable plunger 37 is, preferably, a solid rod element having a first conical shaped end tip 39 for engaging the grease 30, and a second end in the form of a transverse handle 41, spaced from first end 39. The first conical shaped end tip 39 is provided with essentially the same pitch angle as that of frusto-conical flange 32 to thereby permit the plunger to completely force all of grease 30 out of the open cylinder 28 when plunger 37 is completely depressed.

Handle 41 serves to permit manual pressure to be applied to plunger 37 and force grease 30 through open tip end 36 into the center of a bearing assembly 24. The pressurized grease 30 follows the direction of the arrows shown (not designated), through the bearing raceways. This pressurized grease movement surrounds and embeds, or packs, each ball in the ball bearing assembly 24 with fresh grease 30, while forcing old grease therefrom. Space filler 26 serves as a grease saver by minimizing the usable size of cavity 20 employed in a grease packing procedure. Space filler 26 is provided with a horizontal surface area that directs the grease from opening 33 upward through bearing assembly 24.

Figure 2:
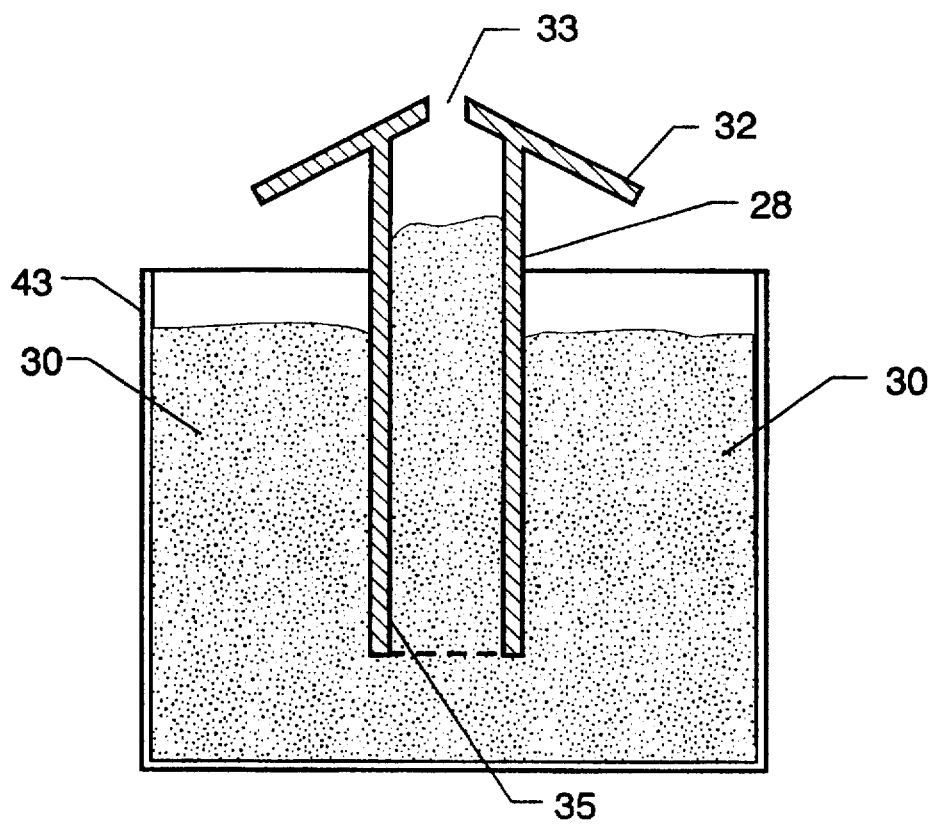
FIG. 2 is a part schematic section view illustrating the procedure for filling the grease applicator with new grease.

Referring to FIG. 2, the procedure for filling elongated open cylinder 28 will now be described. As shown therein a can, or vessel 45, containing a quantity of lubricating grease 30 therein, is provided. Open cylinder 28 is disposed in an inverted position with the second open end 35 thereof manually pushed, or forced, through the highly viscous grease 30 in vessel 45 to thereby fill cylinder 28. To prevent the grease from exiting open cylinder 28 when removed from can 45, the operator or mechanic, places a finger over opening 33 therein to thereby trap any air and create a suction, or vacuum force, on any grease contained therein and prevent grease exit while cylinder 28 is extracted from can 45.

The excess grease on the exterior of cylinder 28 is then wiped off and the cylinder is ready for receipt of plunger 37 and operation as described hereinbefore in reference to FIG. 1.

It is thus seen that the present invention provides a simple, inexpensive, and speedy, or fast action, lubricator system for packing friction bearings that involves a relatively clean procedure operation.

Although the invention has been described relative to a specific embodiment thereof, it is not so limited and there are numerous variations and modifications of the invention that will be readily apparent to those skilled in the art in the light of the above teachings.

For example, no specific materials have been described for construction of the various parts of the lubricator of the present invention, it is to be understood that bearing support stand 12, open cylinder 28 and piston 37 may be machined or molded from any suitable material having the necessary physical property characteristics to perform as described. These materials include, but are not limited to metals, such as stainless steel and aluminum alloys, Pyrex glass, plastics, and composites.

It is therefore to be understood that, within the scope of the appended claims, the invention may be practiced other than as specifically described herein.

What is claimed as new and desired to be secured by Letters Patent of the United States is:

1. Apparatus for applying grease to bearing structures while simultaneously removing old grease therefrom comprising, in combination:

a bearing support stand including a reverse conical central cavity having a stepped surface for horizontally supporting a bearing structure;

a bearing structure horizontally supported by a step of said stepped surface of said bearing support stand;

an elongated open cylinder containing a quantity of lubricating grease perpendicularly disposed relative to said bearing structure;

said open cylinder having a first end contacting said bearing structure;

a manually operated elongated slidable piston having a first end disposed within a second end of said open cylinder and a second end having a handle thereon to permit manual pressure to be applied to said slidable piston; whereby when manual pressure is applied to said handle on said slidable piston to effect slidable movement thereof within said open cylinder, said piston forces grease through said first end of said open cylinder and through said bearing structure to thereby forcibly remove old grease from said bearing structure while simultaneously packing said bearing structure with new grease.

2. The apparatus of claim 1 wherein said first end on said open cylinder contacting said bearing structure includes a frusto-conical flange integrally attached thereto; said frusto-conical flange having an angular pitch essentially equal to the angular pitch of said reverse conical central cavity of said bearing support stand, said frusto-conical flange further having an open end disposed within said bearing structure and serving as a dispensing outlet for the grease forced from said open cylinder into said bearing structure.

3. The apparatus of claim 2 wherein said first end of said manually operated elongated slidable piston is provided with a conical configuration and said conical configuration has a pitch angle essentially equal to the pitch angle of said reverse conical central cavity of said bearing support stand and the pitch angle of said frusto-conical flange integrally attached to said open cylinder.

4. The apparatus of claim 3 wherein the pitch angle for the first end of said manually operated elongated slidable piston, the pitch angle for said frusto-conical flange and the pitch angle for the reverse conical cavity of said bearing support stand is in the range of 10 to 30 degrees.

5. Apparatus for applying grease to bearing structures while simultaneously removing old grease therefrom comprising, in combination:

a bearing support stand disposed on a horizontal surface;

said bearing support stand including a tapered inner stepped surface to support a bearing structure therein;

said inner stepped surface serving to permit horizontal positioning support of multiple diameter wheel bearings therein;

an elongated open cylinder having an integral frusto-conical flange formed at a first end thereof;

said frusto-conical flange having an external surface area taper of substantially the same angular taper as said tapered inner stepped surface of said bearing support stand;

said frusto-conical flange having a central opening therein adapted to be disposed within a body of a wheel bearing supported by said tapered inner stepped surface of said bearing support stand;

said open cylinder having a second open end spaced from said first end thereof with the spacing between said first and said second end of said open cylinder defining a cavity for containing the bearing grease;

a plunger having a first end slidably disposed within said second open end of said open cylinder, and a second end provided with a handle to permit application of manual pressure to said plunger and supply grease from said open cylinder to a wheel bearing supported within said inner stepped bearing support stand.

6. The apparatus of claim 5 including said first end of said plunger terminating in a conical tip area; said conical tip area having an angular pitch substantially equal to the angular pitch of said frusto-conical flange to thereby permit said plunger to force essentially all of the grease contained within said open cylinder out through the central opening of said frusto-conical flange; whereby, when a wheel bearing is horizontally positioned within said tapered inner stepped surface and said frusto-conical flange of said open cylinder is positioned against said wheel bearing, application of manual pressure via said handle on said plunger will force grease contained within said open cylinder through the wheel bearing to simultaneously remove old grease from the wheel bearing while packing the wheel bearing with new grease.

7. The apparatus of claim 6 wherein the pitch angle of said conical tip end area of said plunger, the pitch angle of the frusto-conical flange, and the pitch angle of said reverse conical cavity of said bearing stand are all substantially equal.

8. The apparatus of claim 7 wherein the pitch angle of said conical tip end area of said plunger, the pitch angle of said frusto-conical flange, and the pitch angle of said reverse conical cavity of said bearing stand is in the range of 10 to 30 degrees.

9. The apparatus of claim 5 including a conical space filler disposed at the bottom of said tapered inner stepped surface cavity and serving as a grease saving device by preventing excess grease from reaching the bottom of said tapered inner stepped surface cavity.

* * * * *